United States Patent [19]

Winzeler

[11] 4,023,654
[45] May 17, 1977

[54] BRAKE WITH IMPROVED TORQUE MODULATION

[75] Inventor: James E. Winzeler, East Peoria, Ill.

[73] Assignee: Caterpillar Tractor Co., Peoria, Ill.

[22] Filed: Oct. 19, 1976

[21] Appl. No.: 733,975

[52] U.S. Cl. .................................. 188/170; 92/65; 188/72.3

[51] Int. Cl.² ........................................ F16D 65/24

[58] Field of Search .................... 92/62, 63, 65; 188/72.3, 170; 192/91 A, 91 R

[56] References Cited

UNITED STATES PATENTS

| | | | |
|---|---|---|---|
| 3,680,666 | 8/1972 | Sommer | 188/170 |
| 3,927,737 | 12/1975 | Prillinger et a. | 188/170 X |
| 3,974,896 | 8/1976 | Rach | 188/170 |

*Primary Examiner*—Duane A. Reger
*Attorney, Agent, or Firm*—Wegner, Stellman, McCord, Wiles & Wood

[57] ABSTRACT

A brake with improved torque modulation, including first and second relatively rotatable elements, a plurality of brake discs carried by one of the elements to be rotatable therewith and axially movable thereon, a plurality of reaction plates carried by the other of the elements to be rotatable therewith and axially movable thereon, the discs and the plates being interleaved in alternating fashion to define a pack, an axially movable primary piston adapted for engagement with the pack, springs carried by the second element for biasing the primary piston towards the pack, an expandable chamber in the second element including the primary piston, the chamber being arranged so that when fluid under pressure is directed thereto, the piston will buck the springs, an axially movable secondary piston forming part of the chamber and in bucking relation to the primary piston, the primary piston having a larger surface area facing the interior of the chamber than the secondary piston, a stop for limiting movement of the secondary piston relative to the primary piston, and a projection on the secondary piston for applying a force to less than all of the discs and plates in the pack, the force acting in concert with that provided by the springs. The construction improves the ability to control the brake in the working range of brake torques.

5 Claims, 1 Drawing Figure

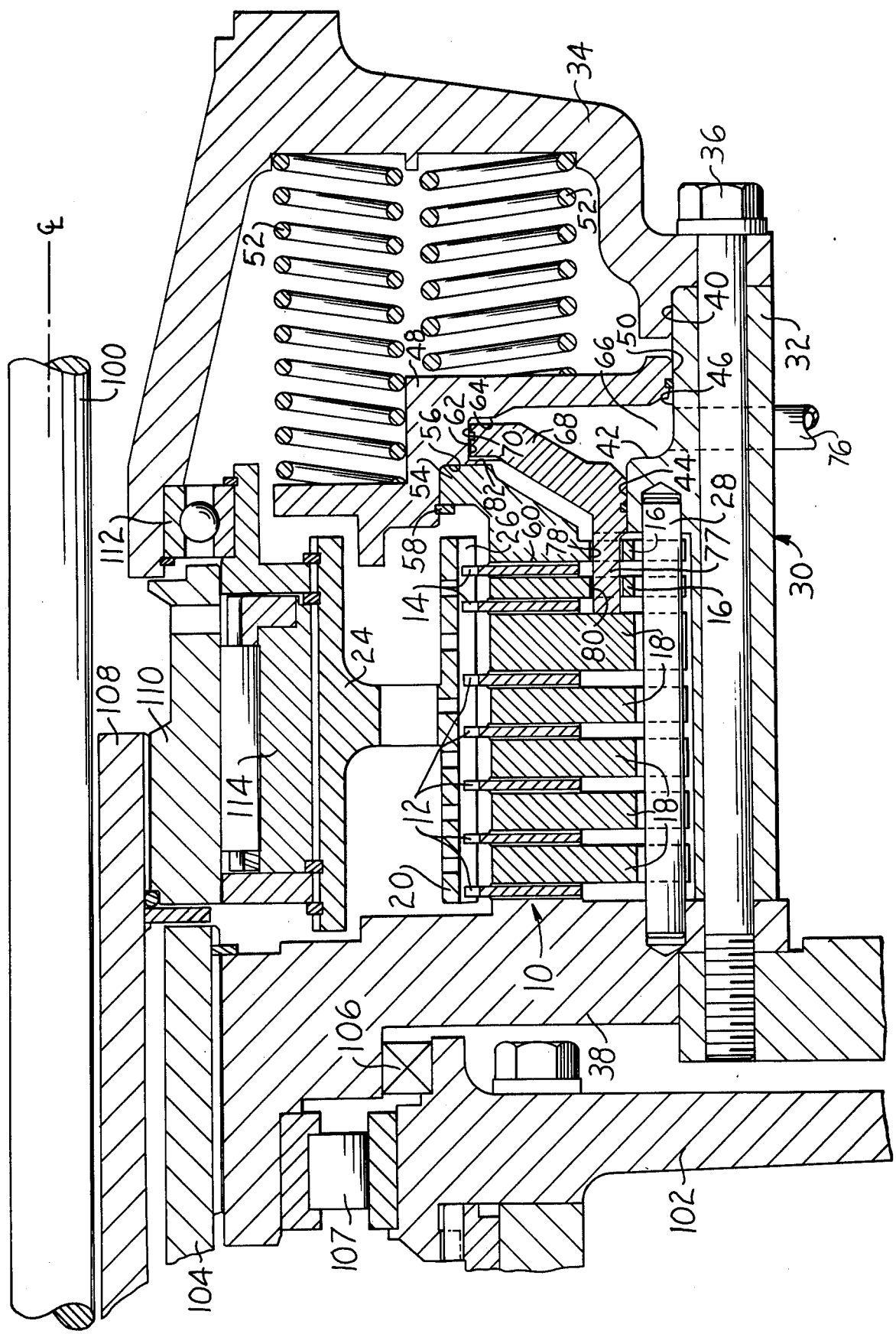

BRAKE WITH IMPROVED TORQUE MODULATION

BACKGROUND OF THE INVENTION

This invention relates to brakes and, more specifically, to brakes with means providing improved torque modulation.

Brake constructions using packs of interleaved discs and reaction plates have been widely used for a variety of purposes. In many instances, such brakes of conventional construction perform acceptably for their intended purpose. However, in other uses, problems attend the functioning of such brakes in that there may be variability in the coefficient of friction between the plates and the discs, in some cases, a large number of discs and plates are required to carry the torque unnecessarily increasing the size of the brake assembly and, in some cases, the range of hydraulic pressure available for regulating the torque capacity of the brake may be limited. Consequently, where relatively accurate control of torque capacity is required, difficulty will be experienced in many prior art constructions.

SUMMARY OF THE INVENTION

It is the principal object of the invention to provide a new and improved brake assembly. More specifically, it is an object of the invention to provide such a brake assembly wherein torque capacity may be accurately modulated.

An exemplary embodiment of the invention achieves the foregoing objects in a brake construction comprising first and second relatively rotatable structures. A plurality of brake discs are carried by one of the structures to be rotatable therewith and axially movable thereon. A plurality of reaction plates are carried by the other of the structures to be rotatable therewith and axially movable thereon. The discs and the plates are interleaved in alternating fashion to define a pack and there is provided an axially expandable chamber carried by one of the structures which includes relatively movable first and second pressure responsive surfaces. The surfaces are oppositely disposed with the first surface having an effective area larger than the second surface. Means are provided for limiting relative movement between the first and second surfaces and means are provided for applying a first axial biasing force to the pack in one direction. Additional means, which include the first surface, are utilized for applying a second axial biasing force to the pack oppositely of the first force and an additional means is provided for applying a third biasing force to only part of the pack in the same direction as the first biasing means. The last-named means include the second surface. Means are provided for introducing pressurized fluid into the chamber. Since the first and second surfaces act oppositely of one another, very fine incremental control of the forces applied to the pack can be achieved.

In a highly preferred embodiment, the first axial force applying means comprises biasing springs which are operative to compress the pack so that the brake construction is spring-engaged, hydraulically disengaged.

In a highly preferred embodiment, the first and second relatively movable surfaces are defined by a primary and a secondary piston, respectively.

The invention contemplates that the pistons are defined by annular members and the structure carrying the same comprises an annular housing encompassing the pistons. The chamber is in part defined by an inner surface of the housing with the inner surface including a peripheral step to define radially inner and outer portions of the inner surface. The primary piston sealingly slidably engages the radially outer portion, while the secondary piston slidably, sealingly engages the radially inner portion. The primary piston further includes an axially extending annular surface spaced radially inwardly of the housing inner surface and the secondary piston also slidably and sealingly engages the axially extending annular piston surface.

Force from the secondary piston is applied to the pack by an axial extension thereon which expands freely through at least one aperture and at least one of the plates.

Other objects and advantages will become apparent from the following specification taken in connection with the accompanying drawing.

DESCRIPTION OF THE DRAWING

The FIGURE is a sectional view of one sector of a brake construction made according to the invention, it being understood that the same is symmetrical about the centerline indicated and is annular about the centerline.

DESCRIPTION OF THE PREFERRED EMBODIMENT

An exemplary embodiment of a brake construction made according the invention is illustrated in the drawing and is seen to include a brake pack, generally designated 10, comprised of annular brake discs 12 and 14 and interleaved reaction plates 16 and 18 which are also annular. The discs 12 and 14 are carried by a carrier 20 on a rotatable element 24 and are mounted for rotation therewith and axial movement thereon by conventional splines 26. The reaction plates 16 and 18 are pinned, at angularly spaced positions, by pins 28 carried by a stationary reaction housing, generally designated 30. The housing 30 includes an annular casting 32 and a bell housing 34 which are secured together by means of a plurality of bolts 36 (only one of which is shown). The housing also includes a radially extending web 38 which confronts the leftmost one of the brake discs 12 to limit axial movement of the pack 10 to the left.

The annular casting 32 has an inner surface 40 which includes a step 42 defining a radially inner portion 44 and a radially outer portion 46 of the surface 40. An annular piston 48 is contained within the housing 30 and its radially outer periphery 50 sealingly and slidably engages the surface 40 at the radially outer portion 46. Compression springs 52 are disposed within the housing 30 at angularly spaced intervals and are interposed between the interior of the bell housing 34 and the right side of the piston 48 so as to impart a biasing force to the piston 48 toward the left as viewed in the drawing.

The piston 48 includes a force applying member 54 which is annular in nature and which abuts a shoulder 56 on the piston 48 and is fixed in place by a locking ring 58. The force applying member 54 includes a planar, annular surface 60 facing the pack 10 and, specifically, the rightmost one of the discs 14. Consequently, the bias of the springs 52 will be applied to the pack 10 to compress the same.

The piston 48 also includes an axially directed, annular surface 62 which is located radially inwardly of the surface 40 on the housing 30. The surface 62 joins with a radially extending surface 64 which extends to the periphery 50 of the piston and which, together with the surface 40, defines an axially expandable chamber 66. The chamber 66 is completed by a secondary piston 68 which is annular in configuration and has its radially inner periphery 70, in sealing, slidable engagement with the annular surface 62 on the piston 48 and its radially outer peripheral surface 74 in slidable sealing engagement with the radially inner portion 44 of the surface 40. A conduit 76 extends through the housing 30 whereby hydraulic fluid under pressure may be delivered to or relieved from the chamber 66, as desired.

The secondary piston 68 includes a plurality of axial extensions 77 (only one of which is shown) angularly spaced about the periphery of the piston 68 and which freely extend through corresponding apertures 78 in the force applying member 54 and an aligned aperture 80 in the reaction plate 16 to abut the rightmost one of the reaction plates 18. The location of the extension 77 is radially outwardly of the outer periphery of the discs 12 and 14.

The force applying member 54 is provided with an annular shoulder 82 which extends radially outwardly of the inner periphery of the secondary piston 68 and serves as a stop. Thus, the shoulder 82 and the surface 64 limit the relative axial movement that can take place between the secondary piston 68 and the primary piston 48.

From the foregoing, it will be appreciated that the piston 48 acts against the entire pack 10 while the secondary piston 68 acts against only part of the pack, namely, the discs 12 and the reaction plate 18 and does not act against the discs 14 and the reaction plate 16. It will also be appreciated from the drawing that the effective surface of the primary piston 48 exposed to the interior of the chamber 66 is greater than that of the secondary piston 68 for purposes that will appear hereinafter.

As illustrated in the drawing, the brake assembly is employed in connection with a winch construction which is only fragmentarily shown and which forms no part of the present invention. The showing of a portion of the winch construction is illustrative only of one use of the improved brake. The winch construction includes a shaft 100 which may be driven by an engine or the like through an appropriate transmission (not shown) and which is coupled, by means of planetary gears or the like, to a winch drum fragmentarily shown at 102. Stationary structure 104 splined to the reaction housing 30, and specifically, the web 38 thereof, may be utilized to support the planet gears interconnecting the shaft 100 and the drum 102.

Seals 106 are interposed between the winch drum 102 and the web 38, as illustrated, and bearings 107 are also utilized. An axially extending member 108 is rotatable about the shaft 100 by means not shown and is splined to an annular rotatable element 110 supported for rotation relative to the reaction housing by bearings 112. A one-way, overrunning clutch 114 is interposed between the element 110 and the carrier 20 for the discs 12 and 14.

In such an installation, when the load being raised by the winch is in an elevated position, and is to be maintained in such a position, the brake will be engaged to brake the shaft 100 and thereby prevent inadvertent reversal of rotation thereof, allowing the load to draw a cable from the drum 102 and fall precipitously. Varying degrees of engagement of the brake may be employed to facilitate lowering of the load at any desired speed under the influence of gravity.

In operation, when pressure is not applied to the chamber 66, the bias provided by the springs 52 against the primary piston 48 will engage the discs 12 and 14 with the reaction plates 16 and 18 to the fullest extent, that is, cause full engagement of the brake. As fluid under pressure is introduced into the chamber 66, the resulting rightward directed force against the primary piston 48 will buck the biasing force provided by the springs 52. At the same time, however, fluid under pressure will urge the secondary piston 68 to the left to impart a biasing force to less than the entire pack 10, namely, to the discs 12 and reaction plates 18. Because of the differential surface areas of the primary piston 48 and the secondary piston 68 exposed to the chamber 66, the total leftward biasing force in such a situation will be less than that when no pressure is applied to the chamber 66.

A continued increase in the pressure of the hydraulic fluid applied to the chamber 66 will cause sufficient rightward movement of the primary piston 48 so that all biasing force to the pack applied by the force applying member 54 is removed. However, a biasing force to part of the pack will continue to be applied by the secondary piston 68 in the manner mentioned previously. A further increase in the pressure will cause additional rightward movement of the piston 48 to the point where the shoulder 82 abuts against the piston 68 to limit its movement relative to the piston 48. At this point, a further increase in pressure within the chamber 66 will begin to cause both the piston 48 and the piston 68 to move to the right against the bias of the springs thereby further releasing the biasing force applied to a part of the pack affected by the secondary piston 68. As pressure continues to increase, eventually, there will be sufficient rightward movement of both pistons 48 and 68 to completely relieve the biasing force and total disengagement of the brake will result.

It can be demonstrated that the torque capacity of the brake is proportional to the hydraulic pressure applied to the chamber 66 as follows. Initially, as hydraulic pressure is increased, torque capacity will fall off quite steeply until the secondary piston 68 engages the shoulder 82. Torque capacity will then drop at a far lesser rate as hydraulic pressure is increased. In a construction wherein the surfaces are dimensionally related, as indicated in the drawing, the breaking point will occur at about one-half the torque capacity, while the point of total disengagement will occur at about four times the pressure required to effect a 50% reduction in torque capacity. Thus, for torque capacities of 50% or less in the construction illustrated, 75% of the regulating pressure is available to regulate torque capacity over the gentle slope of the torque versus pressure curve allowing extremely fine adjustment of torque capacity in this range. Consequently, variables such as the coefficient of friction between the discs and plates and factors such as a limited pressure range for available hydraulic fluid which have heretofore interfered with accurate regulating of brake torque in a brake made according to the invention by reason of the availability of the large percentage of regulating capacity in the critical range of load torque where accurate brake torque selection is required.

What is claimed is:

1. A brake construction, comprising:
   first and second relatively rotatable structures;
   a plurality of brake discs carried by one of said structures to be rotatable therewith and axially movable thereon;
   a plurality of reaction plates carried by the other of said structures to be rotatable therewith and axially movable thereon;
   the discs and the plates being interleaved in alternating fashion to define a pack;
   an axially movable primary piston adapted for engagement with said pack;
   spring means carried by said other structure for biasing said primary piston toward said pack;
   an expandable chamber in said other structure and including said primary piston, said chamber being arranged so that when fluid under pressure is directed thereto, said piston will buck said spring means;
   an axially movable secondary piston forming part of said chamber and in bucking relation to said primary piston;
   said primary piston having a larger surface area facing the interior of said chamber than said secondary piston;
   means limiting movement of said secondary piston relative to said primary piston; and
   means coupled to said secondary piston for applying a force to less than all of the discs and plates in said pack, said force in concert with said spring means.

2. The brake construction of claim 1 wherein said primary and secondary pistons are defined by annular members and said other structure comprises an annular housing encompassing said piston, said chamber being in part defined by an inner surface of said housing, said inner surface including a peripheral step to define radially inner and outer portions of said inner surface, said primary piston sealingly, slidably engaging said radially outer portion, said secondary piston, slidably, sealingly engaging said radially inner portion, said primary piston further including an axially extending annular surface spaced radially inwardly of said housing inner surface, said secondary piston further slidably, sealingly engaging said axially extending, annular piston surface.

3. The brake construction of claim 1 wherein said force applying means comprises an axial extension on said secondary piston extending freely through at least one aperture in at least one of said plates.

4. A brake construction, comprising:
   first and second relatively rotatable structures;
   a plurality of brake discs carried by one of said structures to be rotatable therewith and axially movable thereon;
   a plurality of reaction plates carried by the other of said structures to be rotatable therewith and axially movable thereon;
   the discs and the plates being interleaved in alternating fashion to define a pack;
   an axially expandable chamber carried by one of said structures and including relatively movable first and second pressure responsive surfaces, said surfaces being oppositely disposed with said first surface having an effective area larger than said second surface;
   means for limiting relative movement between first and second surfaces;
   means for applying a first axial biasing force to said pack in one direction;
   means including said first surface for applying a second axial biasing force to said pack oppositely of said first force;
   means including said second surface for applying a third biasing force to only part of said pack in said one direction; and
   means for introducing a pressurized fluid into said chamber.

5. The brake construction of claim 4 wherein said means for applying said first and third biasing forces act to compress said pack and said port of said pack, respectively.

* * * * *